US010242385B2

(12) United States Patent
Abdulkader et al.

(10) Patent No.: US 10,242,385 B2
(45) Date of Patent: Mar. 26, 2019

(54) PREDICTING DEMOGRAPHIC INFORMATION OF AN ONLINE SYSTEM USER BASED ON ONLINE SYSTEM LOGIN STATUS

(71) Applicant: Facebook, Inc., Menlo Park, CA (US)

(72) Inventors: Ahmad Abdulmageed Mohammed Abdulkader, Palo Alto, CA (US); Stephane Taine, Issaquah, WA (US); Vladislav Belous, Menlo Park, CA (US); Seyed Mohsen Amiri, Bellevue, WA (US); Ewa Dominowska, Kirkland, WA (US)

(73) Assignee: Facebook, Inc., Menlo Park, CA (US)

(*) Notice: Subject to any disclaimer, the term of this patent is extended or adjusted under 35 U.S.C. 154(b) by 596 days.

(21) Appl. No.: 14/808,298

(22) Filed: Jul. 24, 2015

(65) Prior Publication Data
US 2017/0024770 A1 Jan. 26, 2017

(51) Int. Cl.
*G06Q 30/00* (2012.01)
*G06Q 30/02* (2012.01)
*H04L 29/08* (2006.01)

(52) U.S. Cl.
CPC ..... *G06Q 30/0269* (2013.01); *G06Q 30/0271* (2013.01); *G06Q 30/0277* (2013.01); *H04L 67/22* (2013.01); *H04L 67/306* (2013.01)

(58) Field of Classification Search
CPC .......... G06Q 30/0269; G06Q 30/0271; G06Q 30/0277; H04L 67/22; H04L 67/306
USPC ................................ 705/14.66, 14.67, 14.73
See application file for complete search history.

(56) References Cited

U.S. PATENT DOCUMENTS

| 2009/0187520 A1* | 7/2009 | Liu | G06O 30/02 706/21 |
| 2009/0240568 A1* | 9/2009 | Ramer | G06F 17/30749 705/14.49 |
| 2010/0257023 A1* | 10/2010 | Kendall | G06Q 30/02 705/14.46 |
| 2011/0093334 A1* | 4/2011 | Wood | G06O 30/02 705/14.53 |

(Continued)

OTHER PUBLICATIONS

Rainier, Maria, "Why Businesses Should Use Google Plus," The Social Media Guide, thesocialmediaguide.com/social_media/why-businesses-should-use-google-plus, retrieved on May 7, 2013 (9 pages).*

*Primary Examiner* — Raquel Alvarez
(74) *Attorney, Agent, or Firm* — Fenwick & West LLP (57) ABSTRACT

An online system using attributes of users to select content for presentation to the users predicts one or more attributes of users whose attributes are unavailable to the online system. For a user with one or more attributes unavailable to the online system, the online system applies a model to attributes of additional users to predict one or more attributes of the user. Attributes of the additional user use in the prediction may include demographic information and interactions with content by the additional users. The online system may determine an accuracy of the model by using the model to predict attributes for users whose attributes are known to the online system and comparing the predicted attributes to the known attributes. If the model's accuracy is less than a threshold value, the online system discontinues using the model to predict attributes of users.

20 Claims, 2 Drawing Sheets

(56) References Cited

U.S. PATENT DOCUMENTS

2011/0231258 A1* 9/2011 Winters ............... G06Q 30/02
　　　　　　　　　　　　　　　　　　　　705/14.53
2016/0092925 A1* 3/2016 Crites ............... G06Q 30/0246
　　　　　　　　　　　　　　　　　　　　705/14.61

* cited by examiner

PREDICTING DEMOGRAPHIC INFORMATION OF AN ONLINE SYSTEM USER BASED ON ONLINE SYSTEM LOGIN STATUS

BACKGROUND

This disclosure relates generally to online systems, and, more specifically, to selecting content for presentation to online system users.

A social networking system allows its users to connect to and to communicate with other users. Users may create profiles on a social networking system that are tied to their identities and include information about the users, such as interests and demographic information. The users may be individuals or entities such as corporations or charities. Because of the increasing popularity of social networking systems and the significant amount of user-specific information maintained by social networking systems, a social networking system allows users to easily communicate information about themselves to other users and share content with other users. For example, a social networking system provides content items to a user describing actions performed by other users of the social networking system who are connected to the user. Presenting users with content items describing interactions may increase user interaction with the social networking system.

Additionally, entities (e.g., a business) sponsor presentation of content items ("sponsored content" or "sponsored content items") via a social networking system to gain public attention for the entity's products or services, or to persuade social networking system users to take an action regarding the entity's products or services. Many social networking systems receive compensation from an entity for presenting social networking system users with certain types of sponsored content items provided by the entity. Frequently, social networking systems charge an entity for each presentation of sponsored content to an online system user (e.g., each "impression" of the sponsored content) or for each interaction with sponsored content by a social networking system user (e.g., each "conversion"). For example, a social networking system receives compensation from an entity each time a content item provided by the entity is displayed to a user on the social networking system or each time a user presented with the content item requests additional information about a product or service described by the content item by interacting with the content item (e.g., requests a product information page by interacting with the content item).

An entity may associate a sponsored content item with targeting criteria specifying characteristics of online system users eligible to be presented with the sponsored content item. This allows the entity to identify a group of online system users to be presented with the sponsored content item, such as online system users likely to be interested in a product or a service associated with the sponsored content item. For example, an entity associates targeting criteria with sponsored content item about surfboards that identify users associated with locations in California or Hawaii as eligible to be presented with the sponsored content item, as these users may be more likely to be interested than the sponsored content item than users associated with other locations. Conventionally, entities identify information associated with online system users (e.g., demographic information in users profiles maintained by an online system) as targeting criteria to identify users eligible to be presented with a sponsored content item. However, to use information associated with an online system user to select content, the online system requires the user to be logged into the online system to allow the online system to identify the user and retrieve information associated with the user by the online system.

Presenting content items, such as sponsored content items, irrelevant to users, an online system may reduce user interaction with content provided by the online system. Reduced user interaction with content may decrease potential revenue to the online system from presentation of sponsored content items. For example, if an online system charges an entity for each interaction with a sponsored content item by an online system user, presenting the sponsored content items to users who are unlikely to have an interest in the sponsored content items are unlikely to interact with the sponsored content item. This lack of interaction may discourage the entity from providing additional sponsored content items to the user for subsequent presentation. When a user is not logged into an online system, the online system is unable to retrieved information associated with the user by the online system, which limits the online system's ability to select content relevant to the user for presentation.

SUMMARY

An online system targets the presentation of content items, including advertisements or other sponsored content items, based on information associated with the users by the online system, such as demographic information. For example, when a user logs into the online system from a client device, the online system retrieves information stored by the online system on the client device that identifies the user (e.g., a cookie), and uses the retrieved information to identify the user. Once the user is identified, the online system may retrieve information associated with the user by the online system and use the information associated with the user to select content items for presentation to the user. For example, the online system identifies content items associated with at least a threshold number of targeting criteria satisfied by information associated with the user by the online system as eligible for presentation to the user.

However, if the online system is unable to identify certain information associated with a viewing user of the online system, the online system may predict the certain information. For example, the online system may be unable to identify information associated with the viewing user if the viewing user is not associated with an account maintained by the online system, if the online system is unable to retrieve information from a client device associated with the viewing user that identifies the viewing user, or if the user has not provided certain information to the online system. To predict information associated with the viewing user, the online system applies a model to information describing certain interactions performed by the user, such as content from the online system or from third party systems that the viewing user has accessed via a client device or other interactions with content performed by the user. For example, application of a model to information associated with the viewing user indicating the viewing user accessed a webpage for a makeup store using a mobile device on a weekday between 6:00 PM. and 9:00 PM. in California, results in the online system predicting that the viewing user is a female between the ages of 25 and 35. The online system may compare the predicted information associated with the user to targeting criteria associated with various content items when identifying content items eligible for presentation to the viewing user.

In various embodiments, the model used by the online system to predict information associated with a viewing user is trained based on known information associated with additional users of the online system. Examples of information associated with additional online system users used to train the model include: information describing the users (e.g., age, gender, and geographic location), information describing access of content by the users via a network (e.g., Internet Protocol address, type of client device used to access content, type of operating system used to access content, application used to access content, time of day when the content was accessed, type of network connection used to access content, etc.) and information describing content accessed by the user (e.g., websites visited, frequency and duration of access to content from one or more third party systems, etc.). In some embodiments, the online system trains multiple models to predict information associated with online system users. For example, the online system trains different models to predict demographic information associated with users in different geographic locations, during different times of the day, or associated with different users having any suitable common characteristic.

In one embodiment, the online system a model based on information describing users of the online system having at least a threshold likelihood of resembling users with whom the online system has not associated certain information. (e.g., new users of the online system). Additionally, the online system may obtain information for training the model from non-users of the online system via surveys presented to the non-users through third party systems or through other suitable channels (e.g., surveys) or from third party systems (e.g., web analytics servers). Additionally, the online system may exclude information associated with certain online system users of the online system when training the model. For example, if information associated with a user profile of an online system user includes actions associated with the user that indicate multiple users use the user profile (e.g., actions describing inconsistent browsing histories or accessed content associated with the user profile), the online system excludes information associated with the user profile when training the model.

The online system periodically tests the accuracy of trained model, which may vary over time. To test the accuracy of a trained model, the online system uses the trained model to predict certain information associated with users who are associated with the certain information by the online system (e.g., users who have specified the certain information to the online system) and compares the information predicted by the trained model to the information already associated with the user. If the accuracy of the trained model is less than a threshold value, the online system may discontinue using the trained model to predict information associated with online system users, which provides at least a minimum level of accuracy of the information associated with users that is used when selecting content. The threshold value for the prediction model may be a default accuracy rate specified by the online system or may be provided to the online system by a third party that uses information associated with online system users when selecting content for presentation to online system users.

In various embodiments, the online system resumes using a trained model to predict information associated with online system users when the accuracy of the model equals or exceeds the threshold value. In addition to periodically testing the accuracy of trained models, the online system may periodically update or modify one or more trained models. For example, the online system trains a model using information describing user interactions internal to and external to the online system within 30 days from a date when the model was generated. In one embodiment, if the online system has discontinued use of the model to predict information associated with users, the online system may update the model using information describing user interactions internal to and external to the online system within 30 days from a more recent date then resume use of the model.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
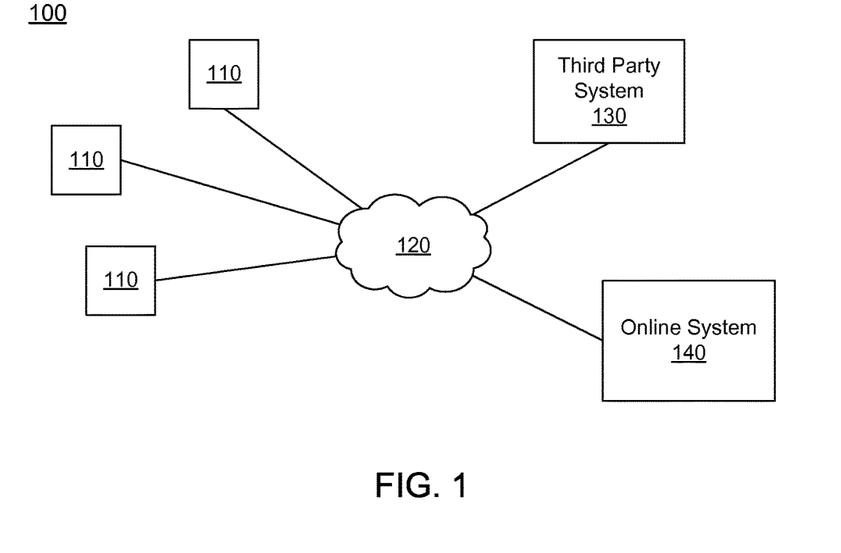
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

Figure 2:
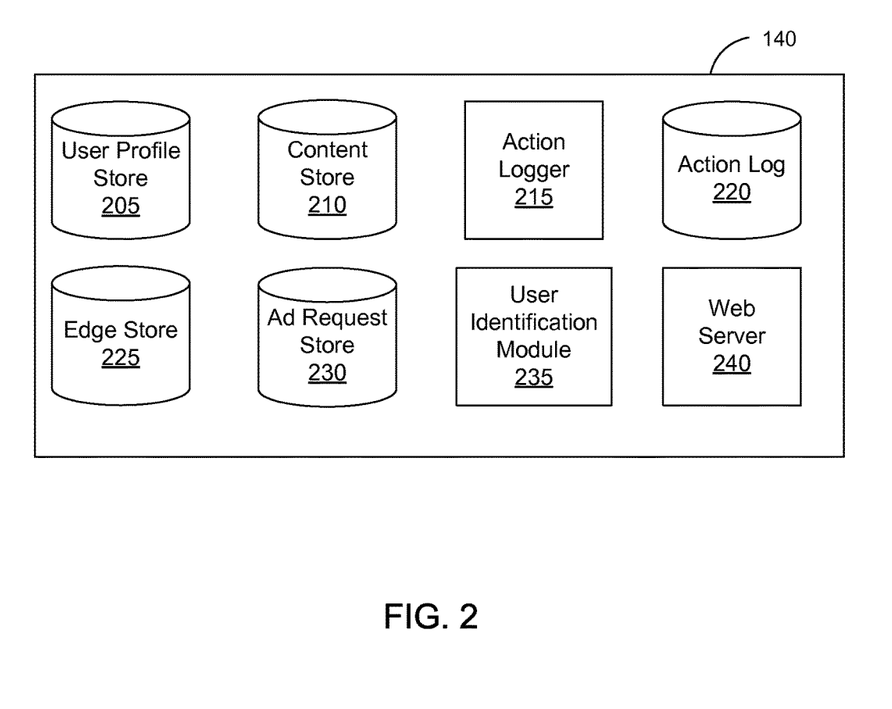
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an ad request store 230, a user identification module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

Additionally, a user profile may include information used by a user to access the online system 140. For example, when a user logs into the online system 140, the online system 140 stores a device identifier of a client device 110 used to log into the online system 140 (e.g., an Internet Protocol address associated with the client device 110 in the user profile associated with the user. Additionally, login credentials associated with a user (e.g., a username and a password) are included in the user profile associated with the user, and the online system 140 may also store information identifying login credentials the user used to log into the online system 140 along with a time associated with each login to the online system 140 by the user. The online system 140 may retrieve information identifying a user from a request by the user to login to the online system 140 (e.g., a user identifier from a network address), retrieve an identifier of an application from which the request was received (e.g., a browser identifier) from the request, or retrieve a unique session identifier associated with the request, and store the retrieved information in the user profile associated with the user.

The online system 140 updates a user profile associated with a user based on information received from the user. For example, if a user updates login credentials used to access the online system 140, the online system 140 modifies the user profile associated with the user to include the updated login credentials. As another example, as a user accesses the online system 140 from different client devices 110, the online system 140 modifies the user profile associated with the user to include device identifiers or other information identifying the different client devices 110 (e.g., Internet Protocol addresses associated with the different client devices 110).

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, interactions with advertisements, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content (also referred to as an "advertisement") and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an ad request by an advertiser and is used to determine an expected value, such as monetary compensation, provided by an advertiser to the online system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the online system 140 receives from the advertiser if advertisement content in an ad request is displayed. In some embodiments, the expected value to the online system 140 of presenting the advertisement content may be determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The user identification module 235 retrieves information from a client device 110 identifying a user of the online system 140 accessing the online system 140. For example, the user identification module 235 retrieves information stored on a client device 110 by the online system 140 (e.g., a cookie) when a user accesses the online system 140 via the client device. Based on the information retrieved from the client device 110, the user identification module 235 identifies a user profile associated with the user from the user profile store 205. In various embodiments, when a user accesses the online system 140 from a client device 110, the online system 140 generates information identifying the user, such as a cookie, and communicates the information identifying the user to the client device, which stores the information generated by the online system 140. The cookie or other information identifying the user may include information indicating whether the user is logged into the online system 140, allowing the user identification module 235 to determine whether a user accessing the online system 140 via a client device 110 is logged into the online system 140 by accessing the cookie or other information stored on the client device 110.

In some embodiments, information associated with the user and stored by the client device 110 includes information identifying the user and may also identify content accessed by the user by the client device 110. For example, the online system 140 stores information identifying a user (e.g., a username, a user identifier, a password, login credentials, an identifier of the client device 110, an identifier of an application used to access the online system 140, an identifier of a session associated with the user accessing the online system 140, etc.) who logs into the online system 140 via a client device 110 on the client device 110. In some embodiments, an application associated with the online system 140 executing on the client device 110 also stores information on the client device 110 identifying content accessed by the user via the client device 110. For example, a cookie stored on the client device 110 by an application executing on the client device 110 and associated with the online system 140 stores identifiers of content (e.g., content items, advertisements) accessed by the user via the client device, information describing actions by the user with content via the client device 110 as well as the content associated with the actions, or other suitable information.

Based on information identifying a user retrieved from a client device 110, the user identification module 235 identifies information associated with the user. For example, the user identification module identifies attributes associated with a user corresponding to information identifying the user retrieved from the client device 110. As an example, the user identification module 235, retrieves an Internet Protocol address and a device identifier from information stored on a client device 110 used by a viewing user to access the online system 140, based on the Internet Protocol address and the device identifier, the online system 140 retrieves information associated with the user profile that is associated with the retrieved Internet Protocol address and client identifier (e.g., a geographic location associated with the user profile and a type of client device 110 associated with the retrieved information). Additionally, the user identification module 235 also determines whether information describing attributes associated with a viewing user retrieved from information stored on a client device 110 used by the viewing user to access the online system 140 matches information associated with the viewing user by the online system 140. For example, the user identification module 235 determines whether a username and password associated with a viewing user retrieved from the client device 110 used to access the online system 140 matches login information associated with an online system user and included in the user profile store 205.

If information associated with a viewing user corresponding to information identifying the viewing user retrieved by the online system 140 does not correspond to information maintained by the online system 140 and associated with the viewing user (e.g., a cookie stored in a browser on a client device 110 used by the viewing user to access the online system 140 does not include information identifying the viewing user, the online system 140 is unable to retrieve information identifying the viewing user from the online system, or the online system 140 does not maintain certain information associated with the viewing user), user identification module 235 applies a model to information associated with additional users to predict certain information associated with the viewing user (e.g., to predict one or more attributes of the viewing user, such as various demographic information). The model is applied to attributes of the viewing user retrieved from the client device 110 and/or stored by the online system 140 as well as to attributes of other users. For example, based on information associated with a viewing user that is retrieved from a client device 110, the online system 140 determines a geographic location and type of client device 110 used by the viewing user to access the online system 140; based on attributes of additional users associated with a geographic location and a type of client device 110 matching the geographic location and the type of client device 110 used by the viewing user to access the online system 140, a model determines additional attributes of the viewing user (e.g., the model predicts demographic information associated with the viewing user based on a distribution of demographic information associated with the additional users). Predicting information associated with a viewing user (e.g., demographic information associated with the viewing user) using a prediction model is further described below in conjunction with FIG. 3.

In some embodiments, the user identification module 235 selects a model from multiple models to apply to information associated with various additional users based on accuracies associated with the various models. For example, the user identification module 235 selects a model associated with a maximum accuracy from models maintained by the user identification module 235 and uses the selected model to determine attributes of a viewing user. Other information may be used by the user identification module 235 to select a model for determining attributes of a viewing user. For example, the user identification module 235 maintains various models each associated with different information associated with a viewing user (e.g., different times of days the viewing user accesses the online system 140, different locations associated with the viewing user) and selects a model associated with at least a threshold amount of information that matches information associated with the viewing user. As an example, the user identification module 235 selects a model associated with a time of day matching a time of day when the viewing user requests to access the online system 140. In another example, the user identification module 235 selects a model associated with a time of day and an application identifier matching a time of day and an application identifier associated with an application used by the viewing user to access the online system 140.

Additionally, the user identification module 235 periodically tests the accuracy of a model, which may vary over time by using the model to predict attributes already associated with users (e.g., to predict attributes of users who have previously specified the attributes) and compares the attributes predicted by the model to the attributes already associated with the users. For example, at two-hour intervals, the user identification module 235 applies a model to attributes of various users who have specified attributes to the online system 140 and determines the accuracy of the model by comparing the attributes predicted by the model to attributes specified by the users. If the accuracy of a model is less than a threshold value, the user identification module 235 may discontinue using the model to predict attributes associated with online system users; hence, attributes predicted by a model used by the user identification module 235 have a minimum level of accuracy of the threshold value. The threshold value for the prediction model may be a default accuracy rate specified by the online system 140 or may be provided to the online system 140 by a third party system 130 (e.g., an advertiser) that uses information associated with online system users when selecting content for presentation to the online system users.

In various embodiments, the user identification module 235 resumes using a model to predict information associated with online system users when the accuracy of the model equals or exceeds the threshold value. In addition to periodically testing the accuracy of models, the user identification module 235 may periodically update or modify one or more models. For example, the user identification module 235 trains a model using information describing user interactions internal to and external to the online system within 30 days from a date when the model was generated. In one embodiment, if the user identification module 235 has discontinued use of the model to predict information associated with users, the user identification module 235 may update the model using information describing user interactions internal to and external to the online system within 30 days from a more recent date then resume use of the model. If the updated model has an accuracy that equals or exceeds the threshold value, the user identification module 235 resumes use of the model to predict attributes of users.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that is stored in the content store 210. Additionally, the web server 240 may provide application programming interface (API) functionality to send data directly to native client device operating systems, such as IOS®, ANDROID™, WEBOS®, or BlackberryOS.

Predicting Attributes Associated with a User of an Online System

Figure 3:
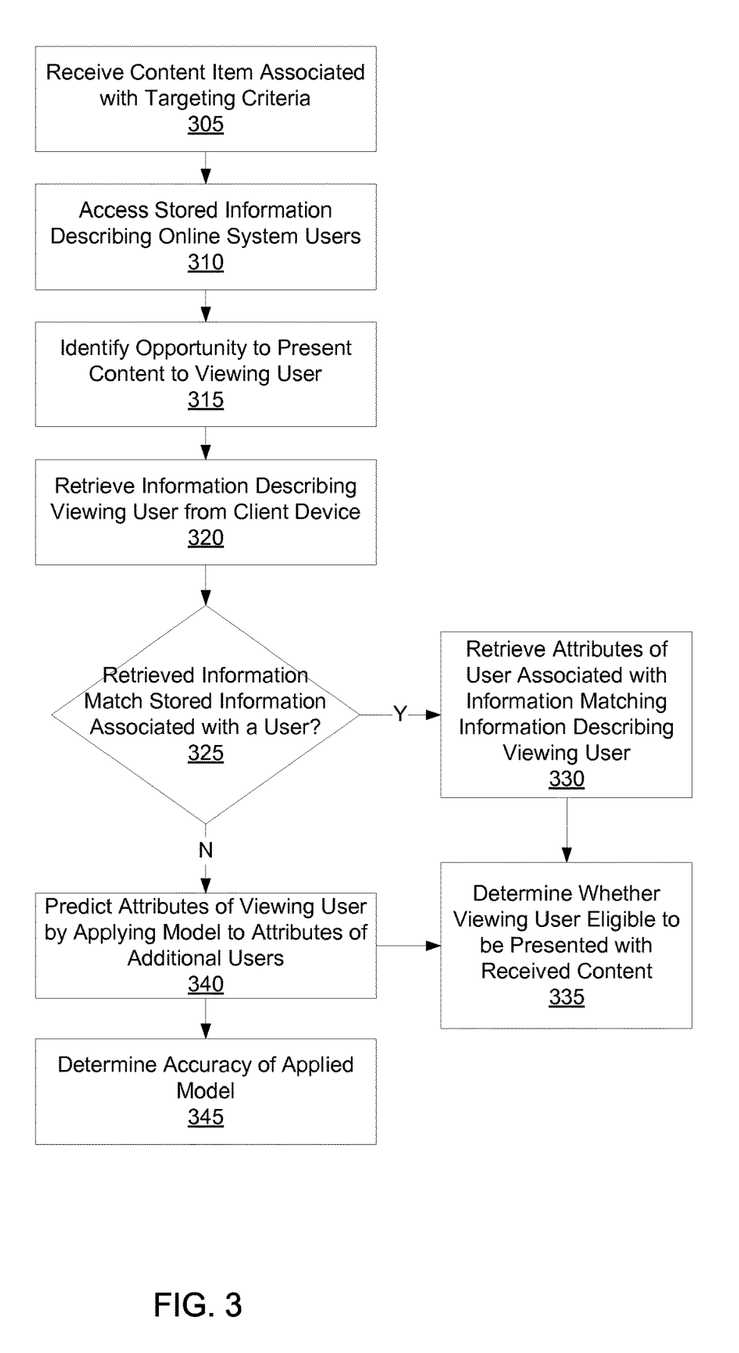
FIG. 3 is a flow chart of a method for predicting information associated with a viewing user of an online system, in accordance with an embodiment.

FIG. 3 is a flow chart of one embodiment of a method for predicting attributes associated with a user of an online system 140. In other embodiments, the method may include different and/or additional steps than those shown in FIG. 3. Additionally, steps of the method may be performed in different orders than the order described in conjunction with FIG. 3 in various embodiments.

The online system 140 receives 305 information describing a content item or an advertisement and one or more targeting criteria associated with the advertisement. For example, the online system 140 receives 305 an advertisement request including an advertisement, a bid amount, and targeting criteria identifying characteristics of users eligible to be presented with the advertisement (e.g., a target group of users). As an example, the online system 140 receives 305 an ad request including targeting criteria identifying users having a specific interest in their user profiles, an ad request including targeting criteria identifying users who have performed one or more certain interactions with content items (e.g., users who have expressed a preference for content items associated with a specific topic), users who have joined a group or attended an event associated with a particular topic, or any other suitable characteristic or combination of characteristics of a user. Additionally, the online system 140 may receive 305 information identifying a content item other than an advertisement in addition to targeting criteria specifying characteristics of users eligible to be presented with the content item. For example, the online system 140 receives 305 a notice of a recalled product from a third party system 130 that is associated with targeting criteria identifying users who have purchased the recalled product. In various embodiments, a target group of users eligible to be presented with the received advertisement (or content item) includes users of the online system 140 having characteristics satisfying at least a threshold number of targeting criteria. As described above in conjunction with FIG. 2, examples of targeting criteria include profile information (e.g., age, gender, geographic location, interests, etc.), actions performed by users (e. g., joining a group maintained by the online system 140, indicating a preference for a page maintained by the online system 140, providing content to the online system 140, content provided by a third party system 130 with which a user interacts), connections between a user and additional users of the online system 140, or any other suitable information.

The online system 140 accesses 310 stored information describing multiple users of the online system 140, with the stored information including one or more known attributes of various users. A known attribute associated with a user is an attribute specified by the user or determined by the online system 140 based on actions or information associated with the user. Example attributes include various demographic information, such as: gender, age, occupation, location, interests, or other suitable information. An example of an attribute determined by the online system 140 and associated with a user is a location received from a client device 110 associated with the user or a location determined from an Internet Protocol address of a client device 110 associated with the user. Stored information accessed 310 by the online system 140 may include user profiles associated with users, connections between users and other users, and actions associated with various users. For example, the online system 140 accesses 310 stored information describing click through rates of online system users for advertisements presented by the online system 140 or content items for which online system users have expressed a preference, as well as prices of applications purchased by various users from third party systems 130.

When the online system 140 identifies 315 an opportunity to present content, such as an advertisement or a content item, to a viewing user accessing the online system 140, the online system 140 retrieves 320 information describing the viewing user from information stored on a client device 110 used by the viewing user to access the online system 140. For example, the online system 140 identifies a request from the viewing user for content, the online system 140 identifies 315 an opportunity to present an advertisement, or other content, to the viewing user and retrieves 320 information describing one or more attributes of the viewing user from a cookie stored in a browser executing on a client device 110 used by the viewing user to access the online system 140. As an example, the online system 140 retrieves 320 information previously stored in a cookie maintained by a client device 110 used by the viewing user; information stored in the cookie may include information identifying the viewing user to the online system 140 (e.g., login credentials, a username, a user identifier), information indicating whether the viewing user is currently logged into the online system 140, or information identifying content accessed by the client device 110. Example information identifying content accessed by the client device 110 include: identifiers of content items or advertisements, descriptions of actions performed by a user associated with the client device and identifiers of content items or advertisements, identifiers of third party systems 130 associated with content accessed via the client device 110, and information describing searches for content performed by the client device 110.

Based on the information describing the viewing user retrieved 320 from the client device 110, the online system 140 identifies attributes associated with the viewing user. For example, based on information retrieved 320 from a cookie stored on the client device 110, the online system 140 identifies an Internet Protocol address and a device identifier of the client device 110, based on the Internet Protocol address the online system 140 identifies a location or time zone of the client device 110 and identifies an operating system of the client device from the device identifier. As an additional example, based on data stored in a cookie on a client device 110 used by the viewing user to access the online system 140 that describes content accessed via the client device 110, the online system 140 identifies one or more topics associated with identifiers of content items or advertisements accessed via the client device 110.

The online system 140 determines 325 whether the identified attributes associated with the viewing user match attributes associated with an online system user included in the information stored by the online system 140. For example, the online system determines 325 whether an Internet Protocol address of a client device 110 and login credentials identified from the information describing the viewing user retrieved 320 from a client device 110 match an Internet Protocol address and login credentials associated with a user and stored by the online system 140. If the online system 140 determines 325 the identified attributes associated with the viewing user match stored attributes associated with an online system user, the online system 140 retrieves 330 information describing additional attributes of the viewing user from the stored attributes associated with the online system user having attributes matching the identified attributes. For example, if the login credentials of the viewing user match login credentials of an online system user, the online system 140 retrieves 330 information describing demographic information associated with the online system user having the attributes matching the identified attributes, actions performed by the online system user having the attributes matching the identified attributes, or connections between the online system user having the attributes matching the identified attributes and other online system users from information stored by the online system 140.

Based on the retrieved attributes of the online system user having the attributes matching the identified attributes, the online system 140 determines 335 whether the viewing user has attributes satisfying at least a threshold number of targeting criteria associated with the received content item or ad request. Hence, the online system 140 determines 335 whether at least a threshold number of the retrieved attributes of the online system user having the attributes matching the identified attributes satisfy targeting criteria associated with the received content. If the online system 140 determines 335 the viewing user is eligible to be presented with the received content, the online system 140 may subsequently include the content (e.g., the content item, the ad request) in one or more selection processes that select content for presentation to the viewing user.

However, if the online system 140 determines 325 the identified attributes associated with the viewing user do not match attributes associated with an online system user included in the information stored by the online system 140, the online system 140 applies one or more models to attributes of additional online system users to predict 340 attributes of the viewing user. For example, if the attributes identified from the information retrieved 320 from the client device 110 does not include information identifying the user (e.g., login credentials, a username, a user identifier) or if the attributes identified from the information retrieved 320 from the client device 110 match attributes of an online system user who has not specified values for one or more attributes (e.g., who has not provided certain types of demographic information), the online system 140 applies a model to attributes of online system users, including online system users who have provided values for the attributes that have not been specified by the online system user having attributes matching attributes of the viewing user or that are not specified because the online system 140 does not include information associated with an online system user matching attributes of the viewing user.

When predicting 340 attributes of the viewing user, the online system 140 accounts for certain attributes of the viewing user that are identified from the information describing the viewing user retrieved 320 from the client device 110. In various embodiments, the online system 140 determines values for one or more attributes from the information retrieved from the client device 110 and applies one or more models to additional online system users having values for the one or more attributes that match the values determined from the information retrieved from the client device 110. As an example, the online system 140 determines a location associated with the client device 110 and one or more topics of content accessed via the client device 110 from the information retrieved 320 from the client device 110 and applies one or more models to attributes of online system users associated with the same location and who have accessed content associated with at least a threshold number of the topics of the content accessed via the client device 110. For example, if the online system 140 identifies that the viewing user has a location in San Francisco, accesses the online system 140 via an IPHONE®, and has accessed content via the client device 110 associated with cheeseburger recipes, the online system 140 predicts 340 attributes of the viewing user by applying one or more models to attributes of online system users who are associated with a location in San Francisco and who have accessed content associated with cheeseburger recipes. As described above in conjunction with FIG. 2, the online system 140 may select a model used to predict 340 attributes of the viewing user based on attributes of the viewing user identified from the information retrieved 320 from the client device 110 (e.g., a model associated with a location identified from the information retrieved from the client device 110).

In various embodiments, the online system 140 identifies online system users associated with certain attributes matching attributes of the viewing user identified from the information retrieved 320 from the client device 110 and applies a model to attributes of the identified online system users. For example, the online system 140 identifies online system users associated with a location matching a location identified from the information retrieved 320 from the client device 110, associated with a time accessing the online system 140 within a time range that also includes a time when the viewing user accessed the online system 140 identified from the information retrieved from the client device 320, and associated with a type of client device 110 (e.g., ANDROID™, IOS®) matching a type of client device 110 identified from the information retrieved 320 from the client device 110. Based on other attributes associated with the identified online system users by the online system 140, the model predicts 340 attributes of the viewing user, such as demographic information associated with the viewing user based on demographic information of the identified online system users. In various embodiments, based on a distribution of demographic information of the identified online system users, the model predicts 340 demographic information associated with the viewing user. For example, the model predicts 340 demographic information for the viewing user as demographic information associated with greater than a threshold percentage of the identified online system users. Alternatively, the model determines likelihoods of demographic information associated with various identified online system users being associated with the viewing user, and predicts 340 attributes of the viewing user as attributes associated with identified online system users having at least a threshold likelihood of being associated with the viewing user. The predicted attributes, such as predicted demographic information, are then stored by the online system 140 in association with the viewing user; for example, the online system 140 stores the predicted attributes in a user profile associated with the viewing user. An example of predicting 340 attributes associated with the viewing user is further described in U.S. patent application Ser. No. 13/770,763, filed on Feb. 19, 2013, which is hereby incorporated by reference in its entirety.

In embodiments where the online system 140 trains multiple models to predict 340 attributes of a viewing user, the online system 140 selects a model to predict 340 attributes of the viewing user. For example, the online system 140 selects a model associated with a maximum accuracy and uses the selected model to predict 340 attributes of the viewing user. The online system 140 may select a model based at least in part on attributes of the viewing user identified from the information retrieved 320. For example, the online system 140 associates different models with different attributes (e.g., different models are associated with different times of day, with different locations, with different types of client devices 110) and selects a model associated with one or more attributes matching attributes of the viewing user identified from the information retrieved 320 from the client device 110 and having a maximum accuracy.

Based on the predicted demographic information associated with the viewing user, the online system 140 determines 335 whether the viewing user has attributes satisfying at least a threshold number of targeting criteria associated with the received content item or ad request. Hence, the online system 140 determines 335 whether at least a threshold number of attributes associated with the viewing user, including predicted attributes, satisfy targeting criteria associated with the received content. If the online system 140 determines 335 the viewing user is eligible to be presented with the received content, the online system 140 may subsequently include the content (e.g., the content item, the ad request) in one or more selection processes that select content for presentation to the viewing user.

Additionally, the online system 140 periodically determines 345 the accuracy of the model used to predict 340 the attributes of the viewing user. In various embodiments, the online system 140 determines 345 the accuracy of the model by applying the model to attributes of online system users for whom the online system 140 stores known attributes (e.g., stores demographic information provided to the online system 140 by the users) to predict attributes of the online system users and comparing the predicted attributes to the known attributes of the user. For example, at three-hour intervals, the online system 140 applies a model to attributes of various users who have specified attributes to the online system 140 and determines 345 the accuracy of the model by comparing the attributes predicted by the model to the attributes specified by the users and stored by the online system 140. For example, the accuracy of the model is a percentage of attributes predicted by the model matching attributes specified by the online system users or other suitable value. If the accuracy of a model is less than a threshold value, the online system 140 ceases using the model to predict attributes associated with users, so the attributes predicted 340 by the model have an accuracy equaling or exceeding the threshold value, which improves selection of content for presentation to users that is based at least in part on attributes predicted for the users. The threshold value may be determined by the online system 140 or may be specified by a third party system 130 providing content to the online system 140. For example, a third party system 130 specifies a minimum accuracy of predicted attributes along with content provided to the online system 140 (e.g., a minimum accuracy is included in an ad request along with an advertisement, a bid amount, and targeting criteria).

In various embodiments, the online system 140 resumes using a model to predict information associated with online system users when the accuracy of the model equals or exceeds the threshold value. Hence, the online system 140 may continue to periodically determine 345 the accuracy of the model and resume using the model to predict attributes when the accuracy equals or exceeds the threshold value. Additionally, the online system 140 may update or modify one or more models used to predict 340 attributes. For example, the online system 140 trains a model using information describing user interactions internal to and external to the online system 140 within 30 days from a date when the model was generated. In one embodiment, the online system 140 updates the model based on user interactions internal to and external to the online system 140 within 30 days of a current date. The online system 140 determines 345 an accuracy of an updated model and uses the updated model to predict 340 attributes of users if the accuracy of the updated model equals or exceeds the threshold value.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
 receiving, at an online system, information describing an advertisement and one or more targeting criteria describing a target group of users of the online system for receiving the advertisement;
 accessing stored information describing a plurality of users of the online system, the information including a plurality of known attributes associated with each of the plurality of users;
 identifying an opportunity to provide the advertisement to each of a plurality of viewing users;
 for each opportunity, determining whether information associated with a viewing user matches information associated with a user of the plurality of users of the online system by:
 retrieving information stored on a client device associated with the viewing user and describing the viewing user, and
 determining whether the retrieved information matches information associated with the user of the plurality of users of the online system;
 for each viewing user associated with information matching information associated with the user of the online system, determining whether the viewing user associated with information matching information associated with the user is eligible to be provided with the advertisement by comparing the targeting criteria of the advertisement to the known attributes associated with the viewing user;
 for each viewing user associated with information that does not match information associated with the user of the online system, retrieving information from the client device of the viewing user and predicting one or more attributes of the viewing user by applying a model to retrieved information from the client device of the viewing user;
 determining whether the viewing user is eligible to be provided with the advertisement by comparing the targeting criteria of the advertisement to the one or more predicted attributes of the viewing user associated with information that does not match information associated with the user of the online system;
 determining an accuracy of the model by:
 for each of a plurality of viewing users associated with information matching information associated with one or more users of the online system, predicting one or more attributes of each of the plurality of viewing users associated with information matching information associated with one or more users of the online system using the model,
 comparing, by a computer of the online system, the one or more predicted attributes of each of the plurality of viewing users associated with information matching information associated with one or more users of the online system to the stored known attributes associated with one or more users of the online system associated with information matching information associated with the viewing user, and determining, by a computer of the online system, an accuracy of the model for a period of time based on the comparison; and responsive to determining the accuracy of the model is less than a threshold value, ceasing use of the model to predict one or more attributes of the viewing users associated with information that does not match information associated with the user of the online system, applying the model to attributes of the identified users of the online system.

2. The method of claim 1, further comprising:

responsive to determining the viewing user is eligible to be provided with the advertisement, including the advertisement in one or more selection processes for selecting content to present to the viewing user.

3. The method of claim 1, wherein predicting one or more attributes of the viewing user by applying the model to attributes of users of the online system comprises:

identifying users of the online system having one or more attributes matching attributes of the viewing user; and applying the model to attributes of the identified users of the online system.

4. The method of claim 3, wherein predicting one or more attributes of the viewing user by applying the model to attributes of users of the online system further comprises:

storing the predicted one or more attributes of the viewing user in association with information identifying the viewing user.

5. The method of claim 1, wherein the predicted one or more attributes comprise demographic information associated with the viewing user.

6. The method of claim 1, wherein the stored information describing the plurality of users of the online system includes information identifying each user of the online system.

7. The method of claim 6, wherein information identifying the user of the online system is selected from a group consisting of: login credentials associated with the user, a user identifier associated with the user by the online system, a username associated with the user by the online system, an identifier of an application used by the user to access the online system, an identifier of a client device associated with the user, and any combination thereof.

8. The method of claim 1, wherein the stored information describing the plurality of users of the online system includes information describing user interactions with content by one or more of the plurality of users.

9. The method of claim 1, wherein the information stored on the client device associated with the viewing user comprises a cookie.

10. The method of claim 1, further comprising:

determining the accuracy of the model at a subsequent time; and responsive to determining the accuracy of the model at the subsequent time equals or exceeds the threshold value, resuming use of the model to predict one or more attributes of the viewing users.

11. The method of claim 1, wherein the retrieved information to which the model is applied to predict one or more attributes of the viewing user includes one or more of: a location of the user device of the viewing user and one or more topics of content accessed via the client device.

12. A computer program product comprising a non-transitory computer-readable storage medium having instructions encoded thereon that, when executed by a processor, cause the processor to:

receive, at an online system, information describing an advertisement and one or more targeting criteria describing a target group of users of the online system for receiving the advertisement;

access stored information describing a plurality of users of the online system, the information including a plurality of known attributes associated with each of the plurality of users;

identify an opportunity to provide the advertisement to each of a plurality of viewing users;

for each opportunity, determine whether information associated with a viewing user matches information associated with a user of the plurality of users of the online system by:

retrieving information stored on a client device associated with the viewing user and describing the viewing user, and determining whether the retrieved information matches information associated with the user of the plurality of users of the online system;

for each viewing user associated with information matching information associated with the user of the online system, determine whether the viewing user associated with information matching information associated with the user is eligible to be provided with the advertisement by comparing the targeting criteria of the advertisement to the known attributes associated with the viewing user;

for each viewing user associated with information that does not match information associated with the user of the online system, predict one or more attributes of the viewing user by applying a model to retrieved information from the client device of the viewing user;

determine whether the viewing user is eligible to be provided with the advertisement by comparing the targeting criteria of the advertisement to the one or more predicted attributes of the viewing user associated with information that does not match information associated with the user of the online system;

determine an accuracy of the model by:

for each of a plurality of viewing users associated with information matching information associated with one or more users of the online system, predicting one or more attributes of each of the plurality of viewing users associated with information matching information associated with one or more users of the online system using the model, comparing, by a computer of the online system, the one or more predicted attributes of each of the plurality of viewing users associated with information matching information associated with one or more users of the online system to the stored known attributes associated with one or more users of the online system associated with information matching information associated with the viewing user, and determining, by a computer of the online system, an accuracy of the model for a period of time based on the comparison; and responsive to determining the accuracy of the model is less than a threshold value, cease use of the model to predict one or more attributes of the viewing users associated with information that does not match information associated with the user of the online system.

13. The computer program product of claim 12, wherein predict one or more attributes of the viewing user by applying the model to attributes of users of the online system comprises:

identify users of the online system having one or more attributes matching attributes of the viewing user; and
apply the model to attributes of the identified users of the online system.

14. The computer program product of claim 13, wherein predict one or more attributes of the viewing user by applying the model to attributes of users of the online system further comprises:
store the predicted one or more attributes of the viewing user in association with information identifying the viewing user.

15. The computer program product of claim 12, wherein the predicted one or more attributes comprise demographic information associated with the viewing user.

16. The computer program product of claim 12, wherein the stored information describing the plurality of users of the online system includes information identifying each user of the online system.

17. The computer program product of claim 16, wherein information identifying the user of the online system is selected from a group consisting of: login credentials associated with the user, a user identifier associated with the user by the online system, a username associated with the user by the online system, an identifier of an application used by the user to access the online system, an identifier of a client device associated with the user, and any combination thereof.

18. The computer program product of claim 12, wherein the stored information describing the plurality of users of the online system includes information describing user interactions with content by one or more of the plurality of users.

19. The computer program product of claim 12, wherein the non-transitory computer readable storage medium further has instructions encoded thereon that, when executed by the processor, cause the processor to:
determine the accuracy of the model at a subsequent time; and
responsive to determining the accuracy of the model at the subsequent time equals or exceeds the threshold value, resume use of the model to predict one or more attributes of the viewing users.

20. The computer program product of claim 12, wherein the retrieved information to which the model is applied to predict one or more attributes of the viewing user includes one or more of: a location of the user device of the viewing user and one or more topics of content accessed via the client device.

* * * * *